July 4, 1967  G. L. ROBINSON  3,329,183

SAW CHAIN

Original Filed July 13, 1964

INVENTOR.
GARETH L. ROBINSON
BY
Wheeler, Wheeler & Wheeler
ATTORNEYS.

United States Patent Office 3,329,183
Patented July 4, 1967

3,329,183
SAW CHAIN
Gareth L. Robinson, Bridgenorth, Ontario, Canada, assignor to Outboard Marine Corporation, Waukegan, Ill., a corporation of Delaware
Continuation of application Ser. No. 382,133, July 13, 1964. This application Aug. 8, 1966, Ser. No. 571,130
13 Claims. (Cl. 143—135)

This application is a continuation of application Ser. No. 382,133, filed July 13, 1964, now abandoned.

The invention relates generally to chain saws and more particularly to saw chains used on such saws.

As is well known, during use a saw chain is normally guided in a groove or track in the peripheral edge of a cutter bar and travels, at the outer end or nose of the cutter bar, about a path having a relatively small radius. Such saw chains commonly carry an articulated series of cutting teeth which are located in raised relation to the chain proper and which are spaced along the chain with gaps or voids present in the area above the chain proper between successive cutting teeth.

This arrangement presents safety problems resulting from attempted cutting action of the cutting teeth when traversing the rounded nose of the cutter bar and when the chain saw is employed in the cutting of relatively small diameter timber such as brush and branches.

In the first instance, during the initial part of the travel of a cutting tooth around the relatively sharply curved cutter bar nose, the cutting edge has a tendency to attempt a thicker cut or slice of wood than the cutting tooth is capable of removing. This situation occurs even with teeth having a so-called depth gauge located in forwardly located, relatively closely adjacent relation to the cutting edge. Such attempted penetration of the cutting edge at an excessive depth during initial travel around the nose of the cutter bar causes kick-back or abrupt bodily movement of the chain saw upwards out of the cut toward the operator.

When cutting timber of smaller diameter, the relatively deep and sharp valleys or voids between successive teeth, or between the trailing part of one tooth and the depth gauge adjacent the next tooth, can result in gripping or snagging of the smaller diameter timber with consequent possible injurious effects to the operator.

In accordance with the invention, the above two disadvantages are eliminated or at least substantially minimized by the use of a safety link including a tang which extends outwardly beyond the chain proper into the previously existing void or cavity between adjacent teeth. The outer edge of the tang is designed, when cutting smaller timber, to at least partially fill the voids between adjacent teeth, thereby to minimize any possibility of snagging or catching a limb or branch. When traveling around the nose of the cutter bar, the tang is displaced outwardly relative to the cutter bar, either to prevent cutting engagement of the wood by the following cutting tooth or to limit the thickness of the possible cut.

In the specifically disclosed construction, the safety tang is formed integrally with a center link and extends rearwardly with respect to the direction of chain advance into a position above the leading portion of the succeeding center link and into adjacent relation to the succeeding depth gauge or cutting edge, as the case may be.

Other objects and advantages of the invention will become known by reference to the following description and the accompanying drawings in which.

Figure 1:
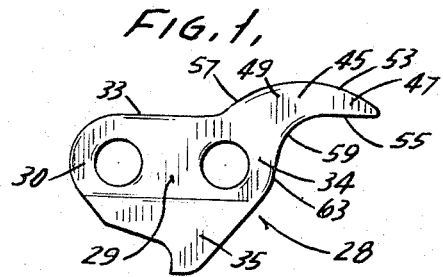
FIGURE 1 is a side elevational view of a center link in accordance with the invention.
Figure 2:
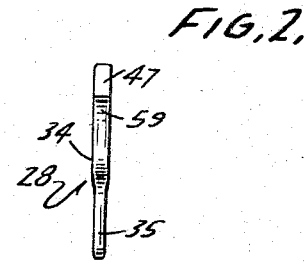
FIGURE 2 is an end elevational view of the link shown in FIGURE 1.
Figure 3:
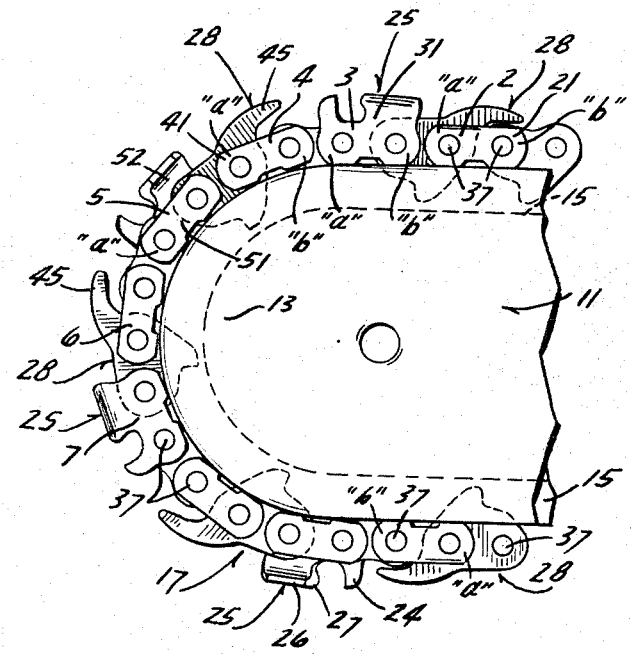
FIGURE 3 is a fragmentary view of a cutter bar with a segment of saw chain guided thereon.
Figure 4:
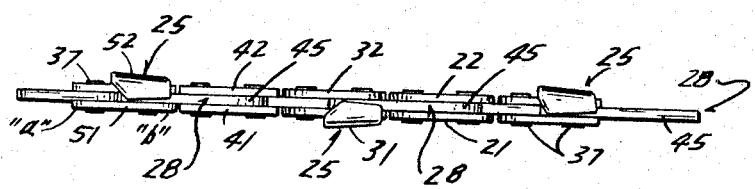
FIGURE 4 is a top elevational view of the saw chain segment shown in FIGURE 3.

Fragmentarily shown in FIGURE 3 is a cutter bar 11 having a rounded nose 13 and a peripheral groove 15. The specifically disclosed saw chain 17 includes a series of opposed pairs 2, 3, 4, 5, 6, and 7 of right and left hand side links 21, 22, 31, 32, 41, 42, 51 and 52, each having a link portion with a forward or leading portion "a" and a trailing or rearward portion "b" and with an upper margin. Every other of said link pairs 2, 3, 4, 5, 6 and 7 alternately includes either a left or right hand cutting link, which cutting links are generically indicated by 25. Each of the cutting links 25 includes a cutting tooth or portion 26 having along the forward or leading margin a cutting edge 27 which extends, as seen best in FIG. 4, transversely of the chain for at least one half of the width of the chain. The cutting links 25 can include depth gauges 24, as shown, or can be constructed without depth gauges.

Located between successive pairs of spaced links are center links 28 which are disposed between the links of each pair and which include a main portion or link part 29 including a forward or leading portion 30 with a leading edge and a rearward or trailing portion 34 with a trailing edge. Each center link 28 also includes an upper margin 33 and can include, as shown in the drawings, a driving tang 35 which depends from the main part 29 and is adapted for receipt in the peripheral groove 15 to guide chain travel and for engagement by a sprocket (not shown) to cause chain movement.

The various links are connected together in articulated relation by means in the form or rivets 37 or the like joining the leading portion 30 of each center link 28 with the trailing portion "b" of each of the links in the forwardly adjacently located pair of opposed links and by rivets 37 or the like joining together the trailing portion 34 of each center link 28 with the leading portion "a" of the rearwardly adjacent pair of opposed links. The construction thus far described is generally conventional.

The advantages of the invention are obtained by providing various of the center links 28 with an upper or safety tang. As shown, the tangs 45 project from the upper margin 33 of the trailing portion 34, each tang 45 including an end portion 47 and a connecting portion 49.

The end portions 47 extend wholly above the upper margin 33, and in the connected chain, extend above the leading portion 30 of the rearwardly adjacent center link 28 to adjacent the depth gauge 24 carried by the next cutting link 25. In the event that cutting links without depth gauges are employed, the end portion 47 can extend to adjacent the cutting tooth 26. The upper edge 53 of the end portion 47 of the safety tangs 47 is convexly curved to afford smooth travel in the kerf at the nose 13 of the cutter bar 11. The lower edge 55 of the tang end portion 47 is generally straight, being disposed in slightly spaced overlying relation to the upper margin 33 of the succeeding center link 28 when the chain is traveling along the elongated relatively flat edge of the cutter bar.

The connecting portion 49 includes a convexly curved upper edge 57 which merges smoothly with the upper edge 53 of the end portion and which terminates at the upper margin 33 of the main part 29. The lower edge 59 of the connecting portion 49 is concavely formed, merging smoothly with the lower edge 55 of the end portion 47, and the trailing edge 63 of the center link trailing portion 34.

In operation, as the saw chain 17 travels around the nose 13 of the cutter bar 11, the resulting articulation of the saw chain serves to space the upper or outer edge 53–57 of the tang 45 at a greater distance from the periphery of the cutter bar 11 as compared to the condition during travel along the relatively flat elongated part of the cutter bar. Consequently, engagement of the tang edge 53–57 with the kerf spaces the cutter bar 11 from the kerf at a sufficient distance to either eliminate kerf cutting at the nose 13 or to limit such cutting to depths which do not cause serious kick-back problems. The convex condition of the tang edge 53–57 serves to provide smooth travel of the chain in the kerf during movement around the nose 13 of the cutter bar 11.

When cutting relatively small diameter timber, the presence of the tang 45 between the cutting links 25 serves to at least partially fill the previously existing voids, and thereby prevents snagging of such small diameter timber.

Various of the features of the invention are set forth in the following claims.

What is claimed is:

1. A link for a saw chain, said link comprising a main portion having a lower margin, leading and trailing edges, an upper margin extending from said leading edge, said upper margin including a flat edge merging with said leading edge, a lower tang extending from said lower margin, and an upper tang extending from said main portion between said trailing edge and said flat edge of said upper margin, said upper tang having an end portion located entirely above said supper margin of said main portion and a convex upper edge, said upper tang also having a connecting portion joining said end portion to said main portion, said connecting portion having a lower concave edge merging into the lower edge of said end portion and said trailing edge of said main portion, and an upper convex edge merging into said convex upper edge of said end portion and terminating at said upper margin of said main portion.

2. A saw chain comprising a first pair of opposing right and left side links each having leading and trailing portions, only one of said first pair of side links having a cutting edge, a first non-cutting center link having leading and trailing portions, means pivotally connecting said trailing portion of said first center link and said leading portions of said first pair of side links, a second pair of opposed right and left side links each having leading and trailing portions, means pivotally connecting said leading portion of said first center link and said trailing portions of said second pair of side links, a second non-cutting center link, said second center link having a main part with leading and trailing portions and an upper margin and a tang extending above said upper margin and rearwardly of said trailing portion of said main part toward said cutting edge into partially overlying relation to said leading portion of said first center link, and means pivotally connecting said trailing portion of said second center link and said leading portions of said second pair of side links.

3. A saw chain comprising a first pair of opposing right and left side links each having leading and trailing portions, one of said first pair of side links having a cutting edge extending transversely for at least one-half of the width of the chain, a first non-cutting center link having leading and trailing portions, means pivotally connecting said trailing portion of said first center link and said leading portions of said first pair of side links, a second pair of opposed right and left side links each having leading and trailing portions, means pivotally connecting said leading portion of said first center link and said trailing portions of said second pair of side links, a second non-cutting center link, said second center link having a main part with leading and trailing portions and an upper margin, and a tang extending above said upper margin and rearwardly of said trailing portion of said main part toward said cutting edge in partially overlying relation to said leading portion of said first center link, and means pivotally connecting said trailing portion of said second center link and said leading portions of said second pair of side links.

4. A saw chain comprising a first pair of opposing right and left side links each having leading and trailing portions, only one of said first pair of side links having a cutting edge extending transversely of the chain, a first non-cutting center link having leading and trailing portions, means pivotally connecting said trailing portion of said first center link and said leading portions of said first pair of side links, a second pair of opposed right and left side links each having leading and trailing portions, means pivotally connecting said leading portion of said first center link and said trailing portions of said second pair of side links, a second non-cutting center link, said second center link having a main part with leading and trailing portions and an upper margin and a tang extending above said upper margin and rearwardly of said trailing portion of said main part toward said cutting edge into partially overlying relation to said leading portion of said first center link, said tang including an end portion located entirely above the upper margin of said main part and rearwardly of the trailing portion of said main part, said end portion having a convex upper edge, said tang also having a connecting portion joining said end portion to said main part, said connecting portion having a lower concave edge merging into the lower edge of said end portion and into the edge of said trailing portion of said main part and an upper convex edge merging into said upper convex edge of said end portion and terminating at said upper margin of said main part, and means pivotally connecting said trailing portion of said second center link and said leading portions of said second pair of side links.

5. A saw chain comprising a first pair of opposing right and left side links each having leading and trailing portions, only one of said first pair of side links having a cutting edge extending transversely for at least one-half of the width of the chain, a first center link having leading and trailing portions and being without a cutting edge, means pivotally connecting said trailing portion of said first center link and said leading portions of said first pair of side links, a second pair of opposed right and left side links each having leading and trailing portions, said second pair of side links being without cutting edges, means pivotally connecting said leading portion of said first center link and said trailing portions of said second pair of side links, a second center link, said second center link being without a cutting edge and having a main part with leading and trailing portions and an upper margin, and a tang extending above said upper margin and rearwardly of said trailing portion of said main part toward said cutting edge in partially overlying relation to said leading portion of said first center link, said tang including an end portion located entirely above the upper margin of said main part and rearwardly of the trailing portion of said main part, said end portion having a convex upper edge, said tang also having a connecting portion joining said end portion of said main part, said connecting portion having a lower concave edge merging into the lower edge of said end portion and into the edge of said trailing portion of said main part and an upper convex edge merging into said upper edge of said end portion and terminating at said upper margin of said main part, and means pivotally connecting said trailing portion of said second center link and said leading portions of said second pair of side links.

6. A saw chain comprising a first pair of opposing right and left side links each having a link part with leading and trailing portions and with an upper margin, one of said first pair of side links having a transversely extending cutting edge, a first non-cutting center link having a link part with leading and trailing portions and an upper margin, means pivotally connecting said trailing portion of said first center link and said leading portions of said first pair of side links, a second pair of opposed right and left side links each having a link part with leading and trailing portions and with an upper margin, means pivotally connecting said leading portion of said first center link and said trailing portions of said second pair of side links, a second non-cutting center link, said second center link having a link part with leading and trailing portions and an upper margin, and a tang extending above said upper margin and rearwardly of said trailing portion of said link part toward said cutting edge in partially overlying relation to said upper margin of said leading portion of said first center link, and means pivotally connecting said trailing portion of said second center link and said leading portions of said second pair of side links, said upper margins of said link parts being located in spaced relation from said cutting edge in a direction normal to the intended direction of chain travel.

7. A saw chain comprising a first pair of opposing right and left side links each having a link part with leading and trailing portions and with an upper margin, one of said first pair of side links having a cutting edge extending transversely of the chain, a first non-cutting center link having a link part with leading and trailing portions and with an upper margin, means pivotally connecting said trailing portion of said first center link and said leading portions of said first pair of side links, a second pair of opposed right and left side links each having a link part with leading and trailing portions and with an upper margin, means pivotally connecting said leading portion of said first center link and said trailing portions of said second pair of side links, a second non-cutting center link having a link part with an upper margin and leading and trailing portions, and a tang extending from said upper margin, said tang having a pointed end portion located entirely above said upper margin of said link part of said second center link and rearwardly of said trailing portion of said link part of said second center link and extending into overlying relation to said upper margin of said leading portion of said first center link, and means pivotally connecting said trailing portion of said second center link and said leading portions of said second pair of side links.

8. A link for a saw chain, said link comprising a link part having leading and trailing edges, an upper margin extending from said leading edge, said upper margin including a flat edge merging with said leading edge and a single tang extending from said link part between said trailing edge and said flat edge of said upper margin, said tang having a single pointed end located above said upper margin and rearwardly of said trailing edge, said pointed end pointing rearwardly, said upper margin adjacent said leading edge being spaced below said pointed end of said tang.

9. A link for a saw chain, said link comprising a link part having leading and trailing edges, an upper margin extending from said leading edge and having a flat edge part, and a single tang extending from said link part between said trailing edge and said flat edge part of said upper margain, said tang having a single pointed end portion located above said upper margin and rearwardly of said trailing edge, said end portion having a convex upper edge extending from said flat edge part to the end of said end portion, said upper margin adjacent said leading edge being spaced below said pointed end portion of said tang.

10. A link for a saw chain, said link comprising a link part having an arcuate leading edge, an upper margin extending from said leading edge, said upper margin having a flat edge merging with said leading edge, a trailing edge, and a tang extending from said link part between said trailing edge and said flat edge of said upper margin, said tang having a pointed end portion located above said flat edge and rearwardly of said trailing edge, said end portion having a convex upper edge and a lower edge, said tang also having a connecting portion joining said end portion to said link part, said connecting portion having an upper convex edge merging into said convex upper edge of said end portion and terminating at said upper margin adjacent said flat edge.

11. A saw chain comprising a plurality of side cutting links alternately located along the length of the chain, a plurality of non-cutting links connected with said cutting links to form said chain, one of said non-cutting links having a tang occupying at least a portion of the space between adjacent cutting links and extending beyond one end of said one non-cutting link into partially overlying relation to the adjacent end portion of an adjacent non-cutting link.

12. A saw chain comprising a plurality of longitudinally spaced center links, a plurality of longitudinally spaced pairs of right and left side links in the spacings between said center links, each of said center links and said side links having a main part with an upper margin and leading and trailing end portions, means serially and pivotally connecting said center links to said pairs of side links, some of said side links having thereon cutting edges and the remainder of said side links and said center links being non-cutting links, said cutting edges being located only on one of said side links of any one of said pairs of side links and said cutting links being alternately located on opposite sides of said saw chain, and some of said non-cutting links having tangs extending above said upper margins and beyond one of said end portions into partially overlying relation to adjacent end portions of adjacently located non-cutting links.

13. A saw chain comprising a plurality of links each having a main part with an upper margin and leading and trailing portions and including a first pair of opposing right and left side links, said right side link of said first pair of side links having a cutting edge and said left side link of said first pair of said links being a non-cutting link, a first non-cutting center link, a second pair of opposed right and left side links, said second pair of side links being non-cutting links, a second non-cutting center link, and a third pair of opposed right and left side links, said left side link of said third pair of side links having a cutting edge and said right side link of said third pair of side links being a non-cutting link, means pivotally connecting said trailing portion of said first center link and said leading portions of said first pair of side links, means pivotally connecting said leading portion of said first center link and said trailing portions of said second pair of center links, means pivotally connecting the trailing portion of said second center link and said leading portions of said second pair of side links, and means pivotally connecting said leading portion of said second center link and said trailing portions of said third pair of side links, one of said non-cutting links having a tang extending above said upper margin, lengthwise of said chain beyond one of said leading and trailing portions of said one non-cutting link, and into partially overlying relation to the adjacent portion of an adjacent non-cutting link.

References Cited
UNITED STATES PATENTS 2,725,083 11/1955 Ackley _____ 143—135
3,176,733 4/1965 Dobbertin _____ 143—135

DONALD R. SCHRAN, *Primary Examiner.*